April 2, 1935. L. A. PARADISE ET AL 1,996,484
MOWER
Filed June 16, 1934 2 Sheets-Sheet 2
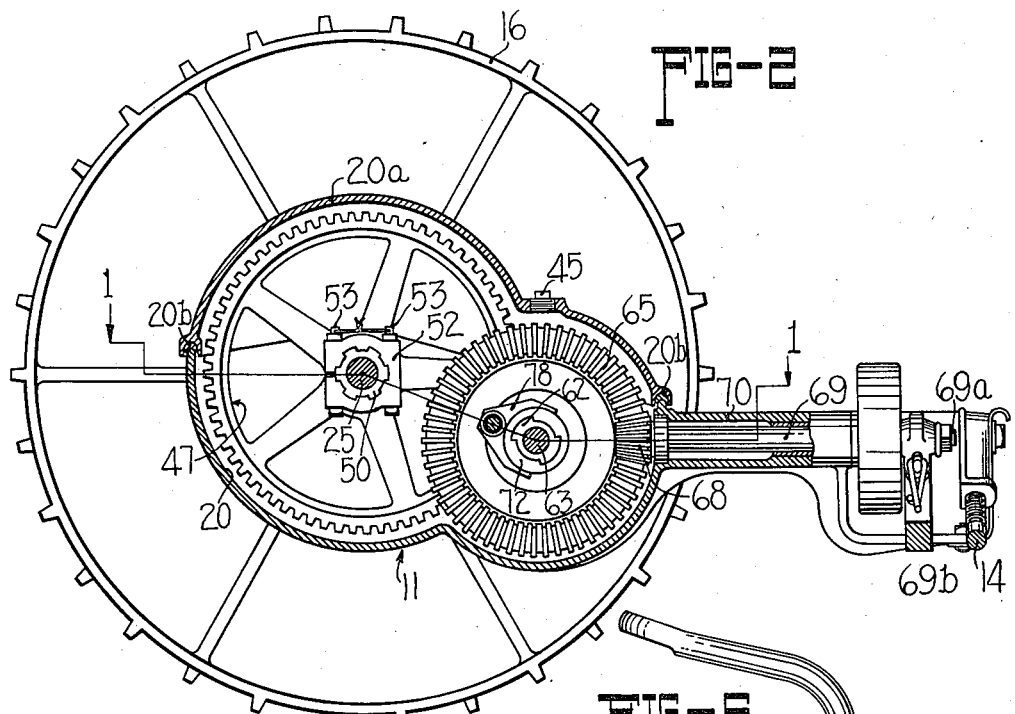
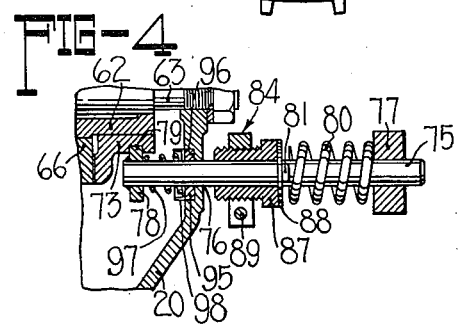
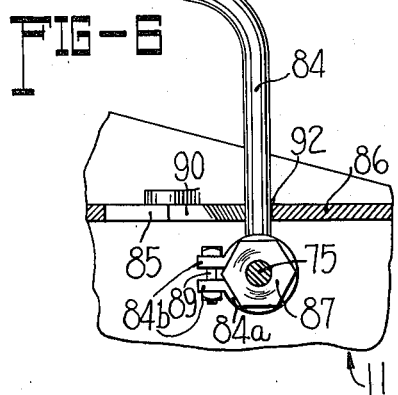
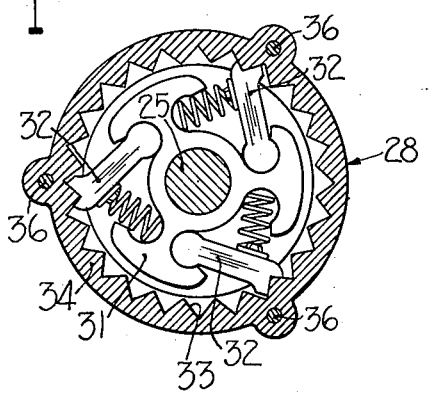
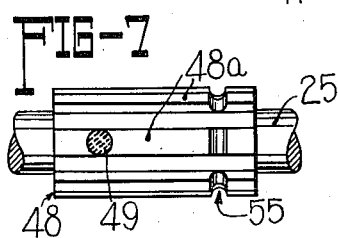
Inventors:
Louis A. Paradise
Wilbur J. Coultas
Norman F. Andrews
By: Brown, Jackson, Boettcher & Dienner.
Attys.

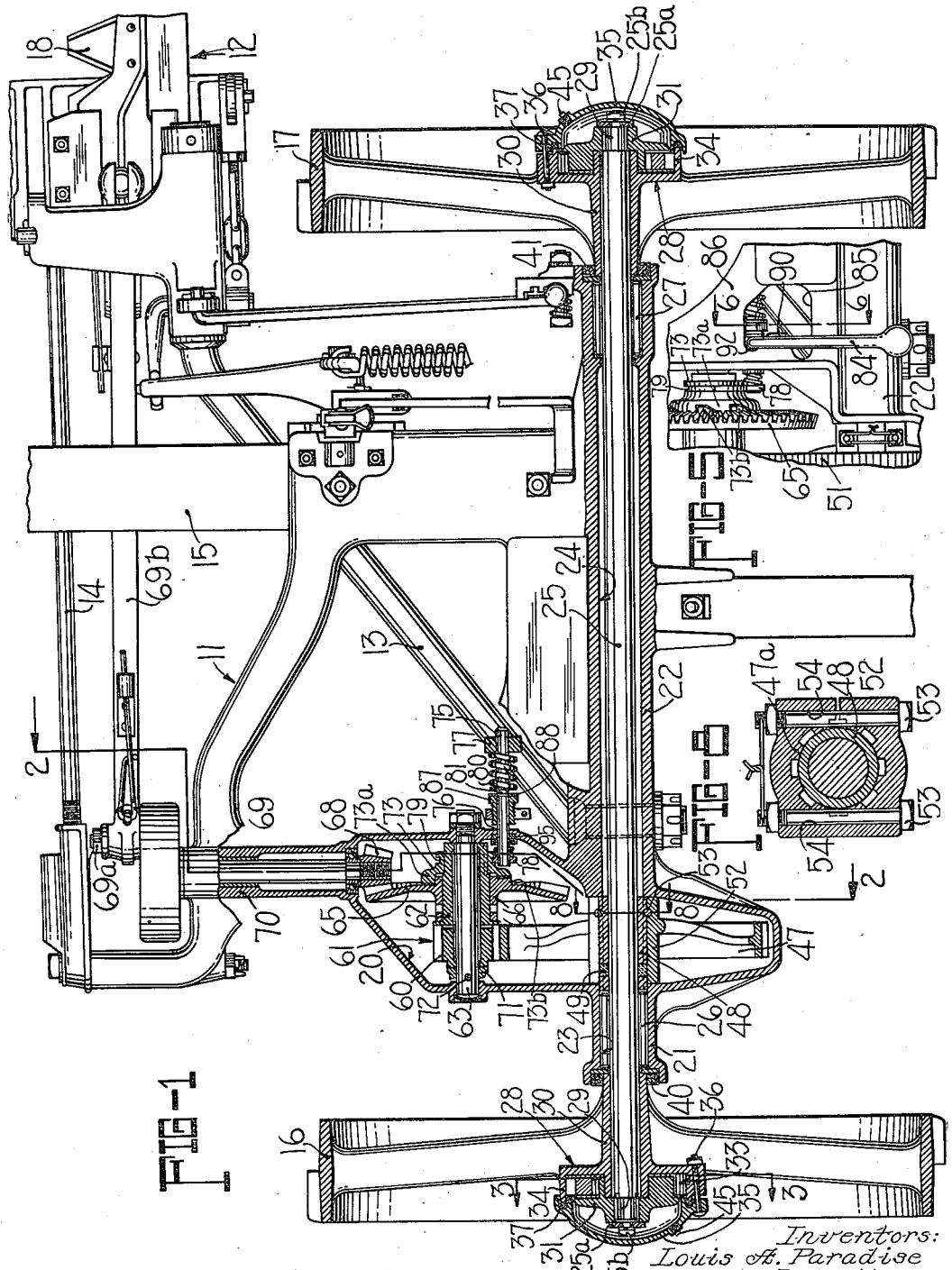

Patented Apr. 2, 1935

1,996,484

UNITED STATES PATENT OFFICE 1,996,484

MOWER

Louis A. Paradise, Wilbur J. Coultas, and Norman F. Andrews, Moline, Ill., assignors to Deere & Company, Moline, Ill., a corporation of Illinois Application June 16, 1934, Serial No. 730,893

14 Claims. (Cl. 56—272)

The present invention relates to mowers, and more particularly to mowers of the type in which the reciprocating sickle of the cutting mechanism is actuated by power derived from the supporting wheels of the implement and in which a clutch device is employed for connecting and disconnecting the drive to the sickle reciprocating means.

The principal object of the present invention is to provide improved driving mechanism between the supporting wheels of the mower and the reciprocating sickle, whereby the same may be enclosed in an oil-tight casing so that such mechanism will be properly lubricated at all times and danger of loss of lubricant will be avoided.

A still further object of the invention is the provision of an improved oil-tight mower drive assembly in which the oil may pass freely from the main gear case to the ratchet drive mechanism associated with each of the supporting wheels and vice versa, so that all the operating parts of the driving mechanism of the mower may be lubricated from a common source.

Another object of the invention is the provision of improved clutch mechanism in the driving train by the actuation of which the operation of the sickle may be controlled.

A further object of the invention is to provide improved means for securing the main driving gear of the driving train to the main axle shaft which is driven by the supporting wheels. Particularly, the present invention contemplates securing means which is easily assembled and readily attachable and detachable when replacing the driving gear.

A still further object of the invention is the provision of improved means for securing the main driving gear to the axle shaft by which the latter is accurately maintained in position in the casing.

Other objects and advantageous features of the present construction will be apparent from the preferred embodiment of the invention as illustrated in the accompanying drawings, in which:

Figure 1 is a top plan view of a mower with certain parts broken away and other parts shown in horizontal section, the view being taken substantially on the line 1—1 of Figure 2;

Figure 2 is a vertical sectional view through the driving mechanism of the mower, taken substantially on the line 2—2 of Figure 1;

Figure 3 is a vertical sectional view taken on the plane of the line 3—3 of Figure 1 and illustrating the ratchet mechanism associated with each of the supporting wheels;

Figure 4 is an enlarged sectional view of the clutch mechanism, shown also in Figure 1, by which the operation of the sickle is controlled.

Figure 5 is a fragmentary top plan view illustrating the clutch operating pedal and the cam lug and notch formed in the frame member that cooperates with said clutch pedal in the operation of the sickle controlling clutch;

Figure 6 is an enlarged vertical sectional view, taken on the plane of the line 6—6 of Figure 5 and illustrating the clutch pedal and the means for securing it to the clutch operating rod;

Figure 7 is an elevational view of the sleeve fixed to the main axle shaft and which carries splines on which the main driving gear is mounted; and Figure 8 is an enlarged vertical cross-sectional view taken on the plane of the line 8—8 of Figure 1 and illustrating the means for securing the hub of the main driving gear to the axle shaft.

The present invention is not concerned with the entire mower structure, but more particularly has to do only with the driving mechanism for the reciprocating sickle, and, therefore, only such parts of the mower as are necessary to a full understanding of the present invention have been illustrated in the accompanying drawings and will be hereinafter described.

As shown in Figure 1, the mower comprises a main frame member 11 in the form of a suitable casting from which the usual cutting mechanism 12 is supported in any conventional manner, as by means of a thrust bar 13 and a tension rod 14. The mower is adapted to be drawn by means of a pole 15 to which a team of horses or a tractor may be connected in any suitable manner not shown. The mower is supported on a pair of wheels 16 and 17, power being derived from such wheels for reciprocating the sickle 18 of the cutting mechanism 12.

Formed integral with the main frame member 11 is a hollow gear casing 20 which extends fore and aft of the mower and sleeves 21 and 22 which extend transversely of the mower. The sleeves 21 and 22 provide tubular openings 23 and 24 in which the supporting axle shaft 25 is disposed, the latter being journaled in suitable bearings 26 and 27 mounted in the sleeve 21 and in the outer end of the sleeve portion 22, respectively, all as shown in Figure 1.

The ends of the axle 25 project outwardly beyond the outer ends of the sleeve members 21 and 22, and the supporting wheels 16 and 17 of the mower are journaled on such outer ends. The axle 25 is rotated by power derived from the supporting wheels 16 and 17 when the mower is moved in a forward direction, and for this purpose each of said wheels has associated therewith a suitable ratchet mechanism indicated in its entirety by the reference numeral 28. As the structure of these two ratchet mechanisms is identical, only one will be described. As shown in Figure 1, each end of the axle 25 is provided with external splines 29 laterally outwardly of the outside of the hub 30 of the associated wheel. The splines 29 engage with internal splines provided in the hub of a pawl plate 31 to lock the axle and plate against relative rotation. The pawl plate 31 is held against longitudinal movement relative to the axle by means of a washer 25a and a nut 25b as shown. As shown in Figure 3, each pawl plate 31 carries a plurality of spring pressed ratchet dogs 32 which upon rotation of the wheel in the forward movement of the mower are adapted to engage with teeth 33 formed around the inner periphery of a drum 34 cast integral with the hub 30 of the associated driving wheel, whereby rotation of the wheels in the forward movement drives the axle 25. Upon backward rotation of the wheels, as by rearward movement of the mower, however, the ratchet dogs will merely slide over the teeth 33, so that the axle 25 will not be rotated by backward rotation of the carrying wheels 16 and 17.

A suitable cover plate 35 is fitted over the outer end of the drum 34 for enclosing the ratchet mechanism, said plate being clamped to the drum by means of a series of circumferentially disposed bolts 36 (see Figures 1 and 3). A suitable gasket, as indicated at 37, is provided between the cover plate 35 and the drum 34 to make the connection between the cover and the drum oil-tight. It will thus be seen that the drums 34 and the cover plates 35 form oil-tight housings for the ratchet mechanisms associated with the two carrying wheels 16 and 17. The lubricant supply in the housings formed by the cover plates and drums, and also in the main gear casing 20, may be replenished when necessary by inserting the lubricant through suitable openings provided in the cover plates 35 and also in the cover plate 20a for the main gear casing, said openings being normally closed by screw plugs 45 (see Figures 1 and 2). Thus the ratchet mechanisms and the gears in the main gear casing 20, which will be hereinafter described, will operate in a bath of oil or other lubricant.

The main gear case 20 is provided with a cover plate 20a which may be bolted or otherwise rigidly secured to the case, and a gasket 20b is interposed between the cover plate 20a and the case 20 to provide an oil-tight seal. For preventing the escape of oil out of the gear case 20 from between the outer ends of the sleeves 21 and 22 and the inner ends of the hubs 30 of the wheels 16 and 17, oil seals 40 and 41 are provided on the outer ends of the sleeves 21 and 22, respectively, as shown in Figure 1.

It will be seen from the foregoing that while oil can pass from each of the ratchet mechanism housings between the shaft 25 and the boring of the hubs 30 of the wheels 16 and 17, through the bearings 26 and 27 and through the openings 23 and 24 to the main gear casing 20, or vice versa, such oil is prevented from escaping to the outside by reason of the oil seals 40 and 41 and the oil-tight seal provided by the gaskets 37 of the ratchet housings and the gasket 20b of the main gear case 20. By this construction, therefore, good lubrication of all of the operating parts of the mechanism thus far described, and a minimum consumption of oil, is assured.

The main driving gear is indicated by the numeral 47, and is fixedly secured to the axle 25 within the main gear case 20, as will now be described. Fixedly secured to the axle 25 at the point where it passes through the gear casing 20, is a sleeve 48 provided with external splines 48a, best shown in Figures 7 and 8. This sleeve has transverse holes 49 bored therethrough adjacent one end, and, in the assembly of the sleeve upon the axle 25, the sleeve is welded to the axle through said holes (see Figures 1 and 4). By securing the sleeve to the axle in this manner the necessity of boring any holes in the axle is eliminated and, of course, the strength of the axle is thus not decreased in any way. This is an advantageous feature because of the fact that boring holes in the axle would materially weaken it.

The main driving gear 47 is disposed over the sleeve 48, the hub 52 of said gear being provided with internal splines 47a adapted to engage with the external splines 48a of the sleeve 48, as shown in Figure 8, whereby said gear is mounted on said axle to rotate therewith. Suitable locking means is provided for preventing endwise movement of the gear 47 relative to the sleeve 48. This locking means is best shown in Figure 8, and comprises a pair of bolts 53 disposed in transverse holes 54 provided in diametrically opposite sides of the hub 52 adjacent one end thereof, the shank portions of said bolts engaging in a circumferential recess 55 (see Figure 7) provided therefor in the sleeve 48. By the provision of the circumferential recess 55 for the reception of the bolts 53, the assembly of the gear 47 upon the sleeve 48 and replacement of the gear is facilitated and simplified because with such construction the gear 47 may be placed on the sleeve 48 without having to pay any attention to the angular position of the gear relative to the sleeve. It is to be particularly noted in connection with this mounting of the gear 47 upon the axle 25 that it is unnecessary to provide any hole or holes in the axle to secure the gear thereon, and yet such gear may be readily removed when necessary.

The hub 52 of the main driving gear 47 is made substantially the same length as the width of the interior of the gear casing 20 at the point where the axle 25 passes through said casing, the ends of the hub engaging against the inner surfaces of the side walls of the casing at this point. It will thus be seen that inasmuch as the gear 47 is held against endwise movement relative to the sleeve by the bolts 53 engaging in the circumferential recess 55 and the sleeve is held against longitudinal movement on the axle by being welded thereto, the engagement of the ends of the hub 52 of the gear 47 with the side walls of the casing 20 provides means for preventing endwise movement of the axle 25 in both directions.

The main driving gear 47 meshes with gear teeth 60 formed integral with the enlarged end portion 61 of a sleeve 62 journaled on a dead spindle 63 fixedly mounted in the casing 20, as shown in Figure 1, or in any other suitable manner. Journaled upon the sleeve 62 substantially centrally of the length thereof is a bevel gear 65 having a hub 66 the outer end of which bears against the inner end of the enlarged portion 61 of the sleeve 62, as shown in Figure 1. The bevel gear 65 meshes with a bevel pinion 68 fixed upon the rear end of a pitman crank shaft 69 journaled in any suitable manner in a sleeve member 70 formed integral with the main frame 11 of the mower, the forward end of the crank shaft 69 being operatively connected by a crank 69a with a pitman 69b which is operated by the crank to reciprocate the sickle 18 of the cutting mechanism 12 before described.

For controlling the degree of engagement of the bevel gear 65 with the bevel pinion 68, a stepped washer 71 is journaled on the fixed spindle 63 and is adapted to contact with the enlarged end portion 61 of the sleeve 62 as shown in Figure 1, the outer or stepped surface of the washer contacts with a pin 72 disposed in a hole in the spindle 63 and extending outward beyond the surface thereof. By turning the stepped washer 71 on the spindle 63 so that the pin 72 will engage the washer at different points on the stepped surface thereof, the washer may be moved longitudinally a slight extent in either direction along the spindle 63, moving with it the sleeve 62, thereby moving the bevel gear 65 journaled on the sleeve 62 toward or from the bevel pinion 68, as will be readily understood.

Means is provided whereby the bevel gear 65 may be locked to the sleeve 62 to rotate therewith so as to drive the crank shaft 69 through its intermeshing engagement with the bevel pinion 68 fixed on the crank shaft. Such means includes a clutch member 73 the hub portion of which is provided with internal splines slidably but non-rotatably engaging over the externally splined inner end of the sleeve 62, as shown in dotted lines in Figure 1. This clutch member 73 is provided with jaw teeth 73a (Figure 5) adapted to engage with companion jaw teeth 73b formed on the adjacent end of the hub 66 of the bevel gear 65, as shown in Figures 1 and 5. It will be seen, therefore that the operation of the crank shaft 69 which is operatively connected with the bevel gear 65 through the bevel pinion 69, and hence the operation of the pitman 69b that reciprocates the sickle 18, are controlled by the actuation of the clutch member 73.

Suitable mechanism is provided for shifting the clutch member 73 to move the clutch teeth 73a thereof into or out of engagement with the jaw teeth 73b on the hub 66 of the bevel gear 65, whereby the drive to the crank shaft 69 may be controlled by the operator of the mower. Such mechanism comprises a shifting rod 75 slidably mounted in an opening 76 in the side wall of the casing 20 and in opening in a lug 77 depending from the lower side of the frame 11. Fixed to the end of the rod 75 that projects into the casing 20 is a shifting fork 78, best shown in section in Figure 4, the prongs of which engage in a circumferential recess 79 formed in the hub of the clutch member 73 adjacent the outer end thereof. The rod 75 is yieldingly urged in the direction to cause the jaw teeth 73a of the member 73 to engage with the jaw teeth 73b on the bevel gear 65 by means of a compression spring 80 which bears against the lug 77 and against a cotter pin 81 disposed in a transverse hole in the rod 75, as best shown in Figure 4.

The position of the rod 75 is controlled by means of a foot lever 84 (see Figures 5 and 6) which extends up through an opening 85 in a reinforcing web portion 86 of the frame 11 and projects rearwardly over the sleeve 22 to a point within convenient reach of the operator on the mower, as shown in Figure 5. The lower end 84a of the foot lever 84 is provided with a threaded opening which is disposed over a threaded collar 87 journaled on the rod 75 and bearing against a washer 88 which, in turn, bears against the cotter pin 81. This threaded end 84a of the lever 84 is split, as shown in Figure 6, and the split ends 84b are clamped together by means of a bolt 89 whereby the foot lever 84 may be locked in any desired position on the threaded collar 87, the purpose of which will be hereinafter explained.

In the disconnection of the drive to the crank shaft 69 by the operation of the foot lever 84, the foot lever cooperates with a cam-shaped lug 90 formed integral with the reinforcing web 86 on one side of the opening 85, whereby by pressing the rear end of the lever 84 downwardly, the cam surface of the lug 90 will cause the lever 84 to be shifted outwardly or to the right as shown in Figures 1 and 5, which in turn will cause the rod 75, to which the foot lever is fixed as above described, to be also shifted in the same direction. This lateral shifting of the rod 75, acting through the instrumentality of the shifting fork 78 fixed thereto, in turn shifts the member 73 in the same direction and away from the gear 65, thereby disengaging the jaw teeth 73a of the member 73 from the jaw teeth 73b on the bevel gear 65, whereby the drive from the sleeve 62, which is in mesh with the main drive gear 47, to the bevel gear 65 is disconnected, and the operation of the crank shaft 69 is thus discontinued. When it is again desired to drive the crank shaft 69 and thus operate the sickle the operator releases the pressure on the foot lever 84 and the spring 89 then acts to move the rod 75 to the left to relock the jaw teeth of the clutch, the foot lever swinging upwardly at the same time. The inner or clutch-engaging position of the clutch member 73 is limited by the engagement of the foot lever 84 in the recess 92 in the web 85 of the frame (see Figures 5 and 6), and this inner position of the member 73 when the lever 84 is in the recess may be adjusted by shifting the position of the lever 84 on the collar 87, which can readily be done by loosening the bolt 89 and then turning the collar 87 in one direction or the other on the rod 75, the screw threaded connection between the collar 87 and the lower end of the foot lever 84 above described permitting such adjustment.

For preventing oil from leaking out of the opening in the casing 20 through which the rod 75 projects, a leather washer 95 is provided, said washer being disposed in a recess 96 provided in the side wall of the casing 20 around the opening. This washer 95 is held in oil-tight engagement with the bottom of the recess and is constantly urged into oil-tight engagement with the rod 75 by means of a spring 97 that bears against the fork member 78 of the clutch operating means, and against a cup-shaped metal washer 98 which, in turn, bears against the leather washer 95.

We claim:

1. A mower comprising a frame, a wheel supported axle journaled on the frame, a driving gear fixed on said axle, a spindle fixed on the frame, a sleeve journaled upon said spindle, said sleeve having a portion on one end in which gear teeth are formed, said gear teeth meshing with the teeth of said driving gear, a bevel gear having a hub journaled upon said sleeve, crank shaft journaled on the frame and having a bevel pinion fixed to one end and meshing with said bevel gear, a clutch member slidably but non-rotatably mounted on the other end of said sleeve, and means for shifting said member into driving engagement with said bevel gear.

2. A mower comprising a frame, a wheel supported axle journaled on the frame, a driving gear fixed on said axle, a spindle fixed on the frame, a sleeve journaled upon said spindle, said sleeve having an enlarged portion on one end in which gear teeth are formed, said gear teeth meshing with the teeth of said driving gear, a bevel gear having a hub journaled upon said sleeve and bearing against the inner end of said enlarged portion, a crank shaft journaled on the frame and having a bevel pinion fixed to one end and meshing with said bevel gear, said pinion holding said bevel gear against the inner end of said enlarged portion, a clutch-toothed member slidably but non-rotatably mounted on the other end of said sleeve, companion clutch teeth formed on said bevel gear, and means for shifting said member into engagement with the clutch teeth on said bevel gear.

3. A mower comprising a frame, a wheel supported axle journaled on the frame, a driving gear fixed on said axle, a spindle fixed on the frame, a sleeve journaled upon said spindle, said sleeve having an enlarged portion on one end in which gear teeth are formed, said gear teeth meshing with the teeth of said driving gear, a bevel gear having a hub journaled upon said sleeve and bearing against the inner end of said enlarged portion, a crank shaft journaled on the frame and having a bevel pinion fixed to one end and meshing with said bevel gear, said pinion holding said bevel gear against the inner end of said enlarged portion, a clutch-toothed member slidably but non-rotatably mounted on the other end of said sleeve, companion clutch teeth formed on said bevel gear, means for shifting said member into engagement with the clutch teeth on said bevel gear, and means for controlling the degree of engagement of the bevel gear with the bevel pinion.

4. A mower comprising a frame, a wheel supported axle journaled on the frame, a driving gear fixed on said axle, a spindle fixed on the frame, a sleeve journaled upon said spindle, said sleeve having an enlarged portion on one end in which gear teeth are formed, said gear teeth meshing with the teeth of said driving gear, a bevel gear having a hub journaled upon said sleeve and bearing against the inner end of said enlarged portion, a crank shaft journaled on the frame and having a bevel pinion fixed to one end and meshing with said bevel gear, said pinion holding said bevel gear against the inner end of said enlarged portion, a clutch-toothed member slidably but non-rotatably mounted on the other end of said sleeve, companion clutch teeth formed on said bevel gear, means for shifting said member into engagement with the clutch teeth on said bevel gear, and means for controlling the degree of engagement of the bevel gear with the bevel pinion, said means comprising a pin fixedly secured in said spindle and a stepped washer journaled on said spindle between said pin and said sleeve.

5. A mower comprising a wheel supported frame, cutting mechanism, means for deriving power from the supporting wheels to operate the cutting mechanism, said means including a clutch comprising companion clutch members, one of which is longitudinally movable into and out of engagement with the other member, means for shifting said movable member comprising a shifting rod supported on the frame for axial sliding movement, a shifting fork on said rod engaging in a recess in said movable member, a threaded collar on said rod, a lever threaded on said collar, and means cooperating with said lever to move said rod when said lever is rocked about the axis of said rod, said threaded collar providing means for adjusting the clutch by turning said collar relative to said lever to change the position of said lever on said collar.

6. A mower comprising a wheel supported frame, cutting mechanism, means for deriving power from the supporting wheels to operate the cutting mechanism, said means including a clutch comprising companion clutch members, one of which is longitudinally movable into and out of engagement with the other member, means for shifting said movable clutch member comprising a shifting rod supported on the frame for axial sliding movement, a shifting fork on said rod engaging in a recess in said movable member, means yieldingly urging said rod in the direction to cause said movable clutch member to engage its companion clutch member, a lever secured to said rod, cam means on the frame cooperating with said lever to move said rod in the direction to disengage said clutch members when said lever is rocked about the axis of said rod, and stop means on the frame cooperating with said lever to limit the engaged position of said members.

7. A mower comprising a wheel supported frame, cutting mechanism, means for deriving power from the supporting wheels to operate the cutting mechanism, said means including a clutch comprising companion clutch members, one of which is longitudinally movable into and out of engagement with the other member, means for shifting said movable clutch member comprising a shifting rod supported on the frame for axial sliding movement, a shifting fork on said rod engaging in a recess in said movable member, means yieldingly urging said rod in the direction to cause said movable clutch member to engage its companion clutch member, a lever fixed to said rod, spring means normally tending to move said rod in a direction to engage said clutch members, means cooperating with said lever to move said rod against the action of said spring in the direction to disengage said clutch members when said lever is rocked about the axis of said rod, stop means cooperating with said lever to limit the engaged position of said clutch members, and means for adjusting said lever longitudinally along said rod for varying the engaged position of said clutch members.

8. A mower comprising a wheel supported frame, cutting mechanism, means for deriving power from the supporting wheels to operate the cutting mechanism, said means including a clutch comprising companion clutch members, one member of which is longitudinally movable into and out of engagement with the other member, means for shifting said movable clutch member comprising a shifting rod supported on the frame for axial sliding movement, a shifting fork on said rod engaging in a recess in said movable clutch member, means yieldingly urging said rod in the direction to cause said movable clutch member to engage its companion member, a threaded collar on said rod, a lever threaded on said collar, cam means on the frame cooperating with said lever to move said rod in the direction to disengage said clutch members when said lever is rocked about the axis of said rod, stop means on the frame cooperating with said lever to limit the engaged position of said members, said threaded collar providing means for adjusting said engaged position by turning said collar relative to said lever to change the position of said lever on said collar.

9. A mower comprising a frame having a gear casing formed thereon and having aligned transverse tubular openings leading into the interior of said casing, a wheel supported axle journaled in said openings and projecting through said casing, and a gear in said casing having a hub non-slidably and non-rotatably mounted on said shaft, the length of said hub being substantially equal to the width of the interior of said casing adjacent said openings and said hub fitting closely therebetween, whereby said axle is held against axial movement relative to said frame in both directions.

10. A mower comprising a frame having a gear casing formed thereon and having aligned transverse tubular openings leading into the interior of said casing, a wheel supported axle journaled in said openings and projecting through said casing, a sleeve fixed on said axle and having external splines, a gear in said casing and having a hub disposed over said sleeve, said hub having internal splines engaging the external splines on said sleeve, said sleeve having a circumferential groove and said hub having a transverse boring extending therethrough tangentially to the base of said groove, and a pin disposed in said boring and engaging in said groove to hold said gear against endwise movement relative to said axle.

11. A mower comprising a frame having a gear casing formed thereon and having aligned transverse tubular openings leading into the interior of said casing, a wheel supported axle journaled in said openings and projecting through said casing, a sleeve fixed on said axle, a gear in said casing non-rotatably mounted on said sleeve, and means carried by said gear for locking said gear against longitudinal movement relative to said sleeve.

12. A mower comprising a frame having a gear casing formed thereon and having aligned transverse tubular openings leading into the interior of said casing, a wheel supported axle journaled in said openings and projecting through said casing, a sleeve fixed on said axle and having external splines, a gear in said casing and having a hub disposed over said sleeve, means for locking said hub against rotation relative to said sleeve, a circumferential groove in said sleeve, and means carried by said hub and engaging in said circumferential groove for locking said gear against longitudinal movement relative to said sleeve.

13. A mower comprising a frame having a gear casing formed thereon and having aligned transverse tubular openings leading into the interior of said casing, a wheel supported axle journaled in said openings and projecting through said casing and through the outer ends of said openings, wheels having hubs journaled on the projecting ends of said axle, ratchet mechanism connecting each of said wheels with said axle, oil-tight closure means for the laterally outer portions of said mechanisms, and means providing an oil-tight seal between the inner ends of said hubs and the frame, whereby oil may circulate freely from said casing through said openings along the outer ends of said axles to said ratchet mechanisms.

14. A mower comprising a frame having a gear casing formed thereon and having aligned transverse tubular openings leading into the interior of said casing, a wheel supported axle journaled in said openings and projecting through said casing and through the outer ends of said openings, wheels having hubs journaled on the projecting ends of said axle, a drum having internal teeth formed integral with the outer end of each hub, means fixed to each end of said axle and carrying a ratchet dog adapted to engage said teeth to establish a one-way driving connection between said wheels and said axle, a cover plate for the outer end of each drum removably fixed thereto in oil-tight relationship therewith, and means providing an oil-tight seal between the inner ends of said hubs and the frame, whereby oil may circulate freely from said casing through said openings along the outer ends of said axles into said drums and vice versa without escape to the outside.

LOUIS A. PARADISE.
WILBUR J. COULTAS.
NORMAN F. ANDREWS.